No. 886,255. PATENTED APR. 28, 1908.
C. E. SARGENT.
STEAM METER.
APPLICATION FILED JAN. 28, 1907.
2 SHEETS—SHEET 1.
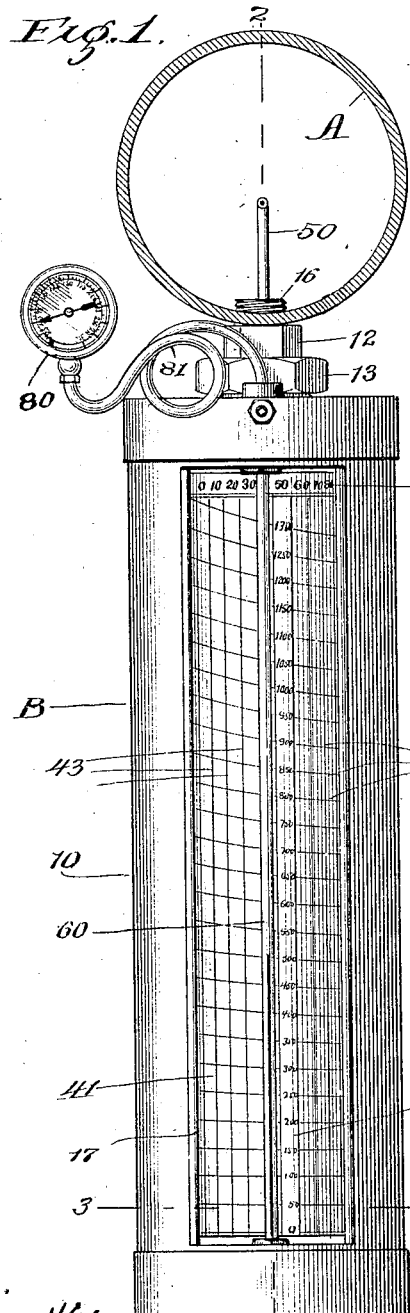
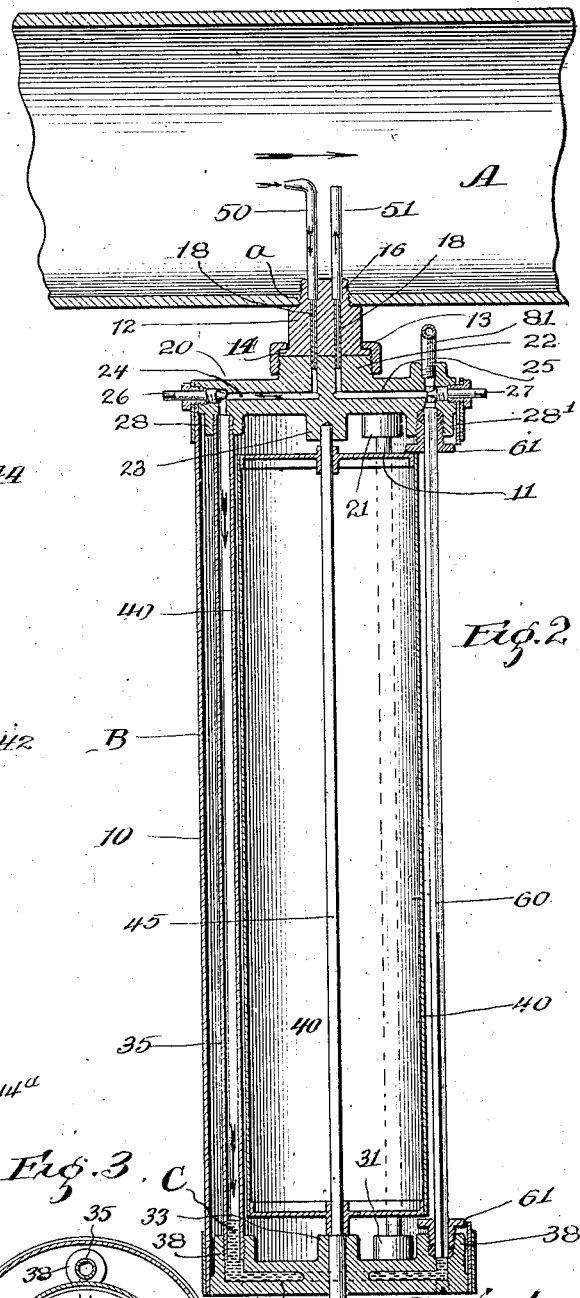
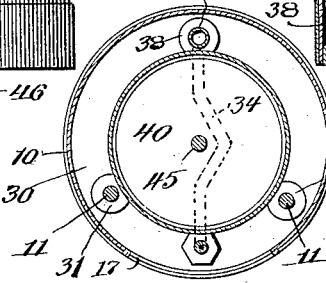

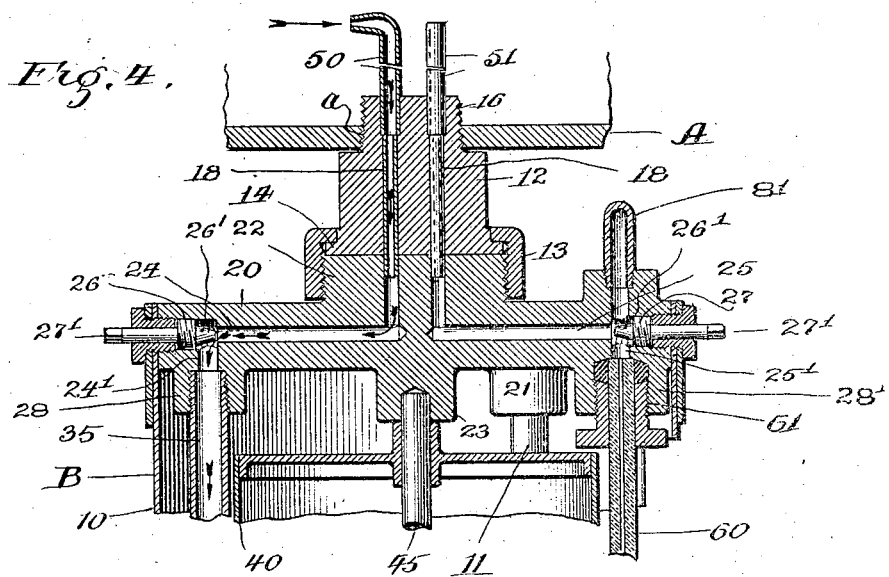

UNITED STATES PATENT OFFICE.

CHARLES E. SARGENT, OF CHICAGO, ILLINOIS, ASSIGNOR TO SARGENT STEAM METER COMPANY, OF CHICAGO, ILLINOIS, A CORPORATION OF ILLINOIS.

STEAM-METER.

No. 886,255.     Specification of Letters Patent.     Patented April 28, 1908.

Application filed January 28, 1907. Serial No. 354,410.

*To all whom it may concern:*

Be it known that I, CHARLES E. SARGENT, a citizen of the United States, residing in the city of Chicago, in the county of Cook and State of Illinois, have invented certain new and useful Improvements in Steam-Meters, of which the following is a full, clear, and exact description.

My invention relates to certain new and useful improvements in meters, the object being to provide a simple, efficient and practical meter for indicating at all times, the weight of steam passing through a given pipe.

Another object is to produce a meter which may be readily attached to a steam pipe or the like, without the necessity of disconnecting the pipe.

Another object is to provide, in a meter of this class, mechanism for indicating the weight of steam per hour or any other given period of time, passing through the pipe regardless of the pressure in the same.

Other objects and advantages will appear in the course of this specification and the essential features will be more definitely pointed out in claims appended hereto.

The invention is clearly illustrated in the drawings furnished herewith in which Figure 1 is a front view of a meter embodying my invention and showing the same attached to a steam pipe. Fig. 2 is a central, vertical section taken on the line 2—2, Fig. 1. Fig. 3 is a horizontal section taken on the line 3—3, Fig. 1. Fig. 4 is an enlarged sectional view of the upper portion of the device. Fig. 5 is a fragmental side view of the indicating dial. Fig. 6 is a plan view of a connecting plug. Fig. 7 is a plan view of the bottom head of the device and Fig. 8 is a sectional view of a modification.

Referring to these drawings, A represents a pipe through which steam or other fluid is conducted from any suitable source of supply, to the engines, pumps, or other apparatus with which it is desired to supply steam or other fluid under pressure.

B represents the meter, which as shown is cylindrical in form and depends from the steam pipe A.

The casing of the meter comprises a shell 10, top and bottom heads 20—30, and connecting rods 11. The ends of the shell surround the heads, and the rods 11 are threaded in bosses 21, 31, formed on the opposing faces of the heads. The upper head contains an upwardly extending screw threaded nipple 22, which is secured to a connecting plug 12, by a nut 13, which is threaded upon nipple 22. The plug 12, contains an annular flange 14, upon its lower end which is engaged by an inwardly extending flange on the nut 13, to clamp the plug 12 in place upon the nipple 22. The upper end of the plug 12 is reduced in diameter to form a nipple 16, which is screw threaded and is screwed into a tapped opening *a*, which is provided in the steam pipe for its connection with the meter.

Within the casing is journaled a rotatable cylinder 40, covered by a dial 41. This dial is made up of vertical equidistant parallel "pressure" lines 43, and intersecting curved lines 42, which cross the vertical lines at practically equidistant points. The pressure represented by each vertical line is noted at 44, around the upper part of the dial. In vertical spaces around the cylinder and sufficiently close so that one space is always in sight are noted as at 44ª, the weights in pounds, represented by the circumferentially inclined curves 42. The cylinder 40 is mounted upon a shaft 45, which is journaled in bosses 23, 33, on the heads 20, 30, and a hand wheel 46 is secured upon the lower end of the shaft 45, which furnishes a convenient means for turning the cylinder. The casing 10, is provided with an opening 17 which exposes the front of the dial 41 to view.

The head 20 contains ports or passage ways 24, 25, which communicate with inlet and outlet nozzles 50—51. As shown in Figs. 2 and 4, the ports 24, 25, contain two upwardly extending portions that register with openings in the plug 12, which openings contain tubes 18, that extend down into the ports 24, 25. The nozzles 50, 51, are secured in the openings in the plug and extend up into the steam pipe, their open ends being preferably diametrically located at a point about 4/10 of the diameter of the pipe from the plug. The end of the inlet nozzle 50, is bent longitudinally of the pipe and opens in a direction opposite to the direction of movement of the current of steam, so that the inertia of the steam due to its velocity will put a pressure, greater than the statical pressure in the pipe, throughout the whole length of the passage communicating with the nozzle 50. As the nozzle 51 opens at right angles to the current of steam, the pressure in this passage is not raised by the inertia of the velocity of the steam flowing by the opening.

The ports 24, 25, contain downward extensions 24', 25', in which are interposed screw threaded plugs 26, 27, for controlling said ports. The plugs 26, 27, contain needle points 26', that are adapted to close up the ports 24, 25, whenever the plugs are screwed home, and the plugs are provided with stems 27', by means of which they may be operated. The port 24, is connected with a port or passage way 34, in the lower head 30, by a pipe 35, which as shown is threaded in bosses 28, 38, formed upon the heads 20, 30. The other ends of the port or passageway 34 and port 25 are connected by a glass sight tube 60, which is secured by means of stuffing boxes 61, in two nipples 28', 38' formed on the heads 20, 30.

An open continuous passageway is thus afforded which extends from the steam pipe A, through the meter and back into the steam pipe. The pipe 35, and port 34, form a sort of cistern or reservoir in which is placed a quantity of mercury, or other suitable liquid C, which is caused to rise in the sight tube 60 in proportion to the inertia of the steam flowing by, the velocity of the steam flowing through the pipe, causing a greater pressure on the mercury in the cistern than in the glass tube. The top of the column of mercury in the tube indicates upon the dial 41, the weight, in pounds, of steam flowing through the pipe per hour or other unit of time. The opening in the transparent or sight tube is very small compared with that in the tube 35 so that there is a large body of mercury in the well as compared with that in the sight tube when the two are on a common level, and a very slight displacement of the mercury in the well will cause a correspondingly great amount of movement in the sight tube. No movement of this mercury is effected by the statical pressure in the pipe but the mercury in the cistern will be depressed and mercury in the sight tube will be raised in proportion to the velocity of the steam flowing through the pipe. Condensation of the steam in the passage way above the mercury will not affect the operation of the meter, as the water in the tubes will be maintained at a constant level and no error can arise from the weight of the water on the cistern. A pressure gage 80, is connected to the passage way in the meter by a tube 81, and is arranged to indicate the pressure of the steam in the pipe A.

A slight modification is shown in Fig. 8. As here shown the plugs 26, 27, are placed in the connecting plug 12, and are arranged to close the ports therein. This construction provides means whereby the meter proper may be removed from the steam pipe without shutting off the steam from the latter. By first closing the ports 24$^a$, 25$^a$, by means of the screw plugs, the meter proper may be uncoupled from the connecting plug.

The weight of steam flowing through a pipe of given diameter, in a unit of time, depends on the statical pressure and the velocity of the steam. As the rise of mercury in the sight tube is proportional to the velocity, the top of the mercury column will indicate the weight, in pounds flowing through for the unit of time and statical pressure for which the dial is calibrated. As statical pressure increases and the same weight of steam passes through, the velocity would be less, therefore the rise of the mercury in the sight tube would be less and for this reason the weight line approaches nearer to the zero line or falls in direct proportion to the velocity. On the other hand, if the statical pressure decreases for the same weight of steam flowing through, the velocity must increase, therefore the mercury would rise higher in the sight tube and the weight line would rise on the dial. If the pressure is constant the mercury will rise in proportion to the velocity and therefore in proportion to the weight flowing through the pipe. By adjusting the dial until the statical pressure behind the sight tube on the dial is the same as that on the test gage 80, the top of the mercury will be on the line of the number of pounds flowing through the pipe in a given unit of time.

While I am aware that the weight of the steam flowing through the pipe can be determined by the formula $V=V_2 gh$, I prefer to calibrate each meter and make the dial from the actual weight of steam passing through in the following manner: The meter is inserted between a source of steam supply, such as high pressure boilers and a surface condenser and with proper valves, different quantities of steam may be allowed to flow through under a constant pressure for a certain unit of time. By weighing the condensed steam, or water, and noting the height of the column of mercury, a series of points are obtained for different quantities or weights of steam flowing through for a constant pressure and for this unit of time. By continuing this operation for different pressures and connecting the points by a series of curved lines the dial may be calibrated, the accuracy of which can be proved by repeating the operation. When the meter is used for compressed air or gas under any pressure, it is calibrated for cu. feet of free air or cu. feet of standard gas. In measuring light fluids such as air or gas, a very slight displacement of the mercury occurs, and for this reason it may be found desirable to arrange the sight tube and dial on an incline, instead of placing them in the vertical position shown. A much longer movement of the mercury in the tube may thus be obtained by the same amount of vertical rise of the same.

In the drawings the gage reads 50 lbs. indicating that the pressure in the pipe is 50 lbs. By turning the dial until the numeral 50, at the top thereof, registers with the glass tube, it will be seen that the top of the column of mercury is opposite the curved line containing the number 500, indicating that the weight of steam flowing through amounts to 500 lbs. for the unit of time for which it was calibrated.

If the pressure in the pipe is greater or less than 50 lbs. the dial is turned to bring the proper column into register with the sight tube. Suppose that the pressure reads 80 lbs. pressure, and that the velocity of the steam remains constant, it will be found that the top of the column is at some point between the weight lines 500 and 550, thus indicating that a greater weight of steam is passing through during the given period of time. If now more steam be used, the velocity will become greater and the mercury will be forced higher up in the sight tube and the increase in weight will be noted upon the dial. By noting the static pressure and turning the dial to bring the proper column into register with the sight tube, the weight of steam can be observed directly on the dial.

I realize that various alterations and modifications of the device are possible and I do not therefore desire to limit myself to the particular construction shown and described, except as particularly pointed out in the appended claims.

I claim as new and desire to secure by Letters Patent:

1. In a meter, the combination of a movable dial, calibrated to indicate the weight of steam passing by during any given period of time and at various degrees of static pressure, a sight tube adjacent thereto, a well communicating with said sight tube, a body of mobile substance in said well, and nozzles communicating with said sight tube and well each opening into the fluid to be measured the nozzle communicating with the well pointing toward the moving column of fluid in a direction opposite to the direction of movement of the column.

2. In a meter, the combination of a rotatable dial, calibrated to indicate the weight of steam passing by during any given period of time and at various degrees of static pressure, a tube adjacent thereto, a well communicating with said tube, a body of mercury in said well and tube, and nozzles communicating with said well and tube and opening into the fluid to be measured, the nozzle communicating with the opening in the well being directed toward the moving column of fluid in a direction opposite to the movement of the column.

3. In a meter, the combination of a movable dial, calibrated to indicate the weight of steam passing by during any given period of time and at various degrees of static pressure, a well, an inlet nozzle directed toward the moving column of fluid to be measured and in a direction opposite to the movement thereof, a connection between the inlet nozzle and well a sight tube communicating with the well and with the fluid to be measured, and a body of mercury in said well and sight tube.

4. In a meter, the combination of a movable dial, calibrated to indicate the weight of steam passing by during any given period of time and at various degrees of static pressure, a sight tube adjacent thereto, a well communicating with said tube, a body of mercury in said well and tube, an inlet nozzle and an outlet nozzle communicating with the fluid to be measured, and connections between the inlet nozzle and well and between the outlet nozzle and sight tube.

5. In a meter, the combination of a movable dial, calibrated to indicate the weight of steam passing by during any given period of time and at various degrees of static pressure, a sight tube adjacent thereto, a well communicating with the sight tube, a body of mercury in said well and sight tube, an inlet nozzle, and an outlet nozzle communicating with the fluid to be measured, connection between the inlet nozzle and well and between the outlet nozzle and sight tube and means for closing the entrance to the sight tube and well.

6. In a meter, the combination of a movable scale, calibrated to indicate the weight of steam passing by during any given period of time and at various degrees of static pressure a sight tube adjacent thereto, a well communicating with said tube, a body of mercury in said well and tube, inlet and outlet nozzles communicating with the fluid to be measured, connections between said inlet nozzle and well, and between said outlet nozzle and sight tube, and screw plugs in said connections.

7. In a meter, the combination of a casing, having a connecting plug for its connection with a suitable pipe, a sight tube, a well tube and a rotatable dial supported in said casing, said casing containing a channel connecting the bottoms of the sight tube and well, a body of mercury in the channel and tubes, an inlet nozzle communicating with the fluid to be measured and with the well tube and sight tubes respectively and an outlet nozzle.

8. In a steam meter, the combination of a casing, a well and sight tube, a rotatable dial supported therein, adjacent to the sight tube, inlet and outlet nozzles, connections between the inlet nozzle and well and between the outlet nozzle and sight tube, and plugs in said connections.

9. In a meter the combination of a casing, a connecting plug, a connecting nut arranged to couple the casing to the connecting plug, inlet and outlet nozzles supported in said plug, a well tube and a sight tube supported in said casing, and communicating with the inlet and outlet nozzles, respectively, a connection between the other ends of the well tube and sight tube respectively forming a continuous passage from the inlet nozzle to the outlet nozzle, a body of mercury in said tubes and a movable dial supported in said casing.

10. In a meter, the combination of a casing, a well, a sight tube communicating therewith, inlet and outlet nozzles communicating with the fluid to be measured and with the well and sight tube respectively, a rotatable dial adjacent to the sight tube, and a hand wheel without the casing, connected with said dial.

11. In a meter, the combination of a cylindrical inclosing wall, top and bottom heads secured in said inclosing wall, an inlet nozzle, a tube communicating therewith, an outlet nozzle and a sight tube communicating therewith, a connection between the lower ends of said tubes, a body of mercury in said tubes and connection, and a dial rotatably movable in said casing adjacent to said sight tube.

12. In a steam meter, the combination of a steam pipe of practically uniform diameter, an inlet nozzle opening into said pipe, a well communicating therewith, a sight tube communicating with said well, an outlet nozzle opening into said pipe and communicating with said sight tube, a body of mobile substance in said well, and a suitably calibrated movable dial, arranged to indicate the weight of steam passing by during a given period of time, for various degrees of static pressure.

13. In a steam meter, the combination of a steam pipe of practically uniform diameter, a steam gage communicating with said pipe, an inlet nozzle communicating with said pipe, a well communicating with said inlet nozzle, a sight tube communicating with said well, an outlet nozzle communicating with said sight tube and opening into the pipe, a mobile substance in said well, and a movable dial calibrated to indicate weight of steam passing by during a given period of time and at various degrees of pressure.

14. In a steam meter, the combination of a steam pipe of practically uniform diameter, a steam gage communicating with said pipe, an inlet nozzle communicating with said pipe, a well communicating with said inlet nozzle, a sight tube communicating with said well, an outlet nozzle communicating with said sight tube and opening into the pipe, a mobile substance in said well and a movable dial having the quantity lines so curved that the height of the mercury will vary inversely as the statical pressure in the pipe for a constant velocity.

In witness whereof I have signed the above application for Letters Patent at Chicago, county of Cook and State of Illinois this 26th day of January 1907

CHARLES E. SARGENT.

Witnesses:
   WM. P. BOND,
   CHARLES O. SHERVEY.